United States Patent [19]

Mumallah et al.

[11] Patent Number: 4,845,134
[45] Date of Patent: Jul. 4, 1989

[54] GELABLE COMPOSITIONS AND USE THEREOF IN STEAM TREATMENT OF WELLS

[75] Inventors: Naim A. Mumallah; Peter H. Doe, both of Bartlesville, Okla.

[73] Assignee: Phillips Petroleum Company, Bartlesville, Okla.

[21] Appl. No.: 6,821

[22] Filed: Jan. 23, 1987

[51] Int. Cl.$^4$ ................... E21B 33/138; E21B 43/24
[52] U.S. Cl. ................... 523/130; 166/272; 166/295; 166/303; 252/8.551; 252/8.554; 524/342; 524/343; 524/346
[58] Field of Search ............ 252/8.551, 8.554; 523/130; 524/346, 342, 343

[56] References Cited

U.S. PATENT DOCUMENTS

| | | | |
|---|---|---|---|
| 2,978,347 | 4/1961 | Koehler et al. | |
| 3,028,297 | 4/1962 | Lagally | |
| 3,993,133 | 11/1976 | Clampitt | 166/272 |
| 4,039,029 | 8/1977 | Gall | 166/294 |
| 4,191,657 | 3/1980 | Swanson | 252/8.55 C |
| 4,240,505 | 12/1980 | Swanson | 166/302 |
| 4,244,826 | 1/1981 | Swanson | 252/8.55 C |
| 4,246,124 | 1/1981 | Swanson | 252/8.55 R |
| 4,250,963 | 2/1981 | Hess | 166/288 |
| 4,300,634 | 11/1981 | Clampitt | 166/272 |
| 4,389,320 | 6/1983 | Clampitt | 252/8.551 |
| 4,460,751 | 7/1984 | Hanlon et al. | 525/371 |
| 4,482,015 | 11/1984 | Falk | 166/288 |
| 4,524,829 | 6/1985 | Hanlon et al. | 166/294 |
| 4,552,217 | 11/1985 | Wu et al. | 166/270 |
| 4,635,727 | 1/1987 | Anderson et al. | 252/8.551 X |

OTHER PUBLICATIONS

Rummo, G., "Crosslinking Delay Achieved with Gel Additive", *Oil & Gas Journal*, Sep. 13, 1982, pp. 84 and 89.
Conway, M. W. et al., "Chemical Model for the Rheological Behavior of Crosslinked Fluid Systems", *Journal of Petroleum Technology*, Feb. 1983, pp. 315–320.

*Primary Examiner*—Herbert B. Guynn
*Attorney, Agent, or Firm*—William R. Sharp

[57] ABSTRACT

A gelable composition is provided which can be injected into a well prior to steam treatment of the well. The composition comprises water, a water-dispersible polymer, a water-dispersible first crosslinker and a water-dispersible second crosslinker, wherein the first and second crosslinkers have differing temperature responsive crosslinking characteristics over the temperature range of about 70° F. to about 400° F. so as to enable crosslinking of the polymer and gelation of the composition over substantially the entire temperature range. Injection of the composition into a "cold" well followed by steam treatment of the well causes the polymer to undergo a two stage crosslinking reaction which produces a particularly effective and stable gel in diverting steam from "thief zones" in the formation surrounding the well.

2 Claims, No Drawings

GELABLE COMPOSITIONS AND USE THEREOF IN STEAM TREATMENT OF WELLS

BACKGROUND OF THE INVENTION

This invention relates to a gelable composition which has different crosslinkers therein which crosslink a water-dispersible polymer in the composition at corresponding different temperature ranges. In another aspect, the invention relates to use of this composition in steam treatment of wells for enhanced oil recovery.

Steam treatment of wells has been practiced for some time in order to heat especially heavy crudes in a subterranean formation so as to reduce the crude viscosity and enhance oil recovery. Many problems have been encountered in such steam treatments, however. One problem results from the typically varying permeability of different strata in the formation. The injected steam will tend to flow into the more permeable portions (hereafter referred to as "thief zones") of the formation, thereby leaving other possibly oil bearing zones untouched.

Various methods of plugging or sealing off thief zones for diverting steam into the less permeable zones have been used. One method involves surfactants which are added to injected steam to form steam foams which plug or increase the flow resistance of thief zones. The desired diversion of steam away from thief zones, however, is achieved for only a short time after the steam injection. As the steam cools and condenses, the foam tends to collapse and the desired effect is lost. Other chemicals have been proposed for blocking their zones, but few are economically attractive or provide good penetration into a formation, and if a permanent blockage of thief zones is desired, few chemicals can withstand the effects of high steam temperatures over prolonged periods. For example, lignosulfonate forms a gel that can block thief zones, but it loses its effectiveness with prolonged exposure to high temperatures.

In summary, the existing technology of steam diversion from thief zones is inadequate insofar as prior thief zone sealants are effective in blocking thief zones for an undesirably short period of time after steam injection, or fail to penetrate deep enough into the formation.

SUMMARY OF THE INVENTION

It is, therefore, an object of the invention to provide compositions which can be injected into a well so as to effectively block the thief zones in the surrounding subterranean formation.

It is also an object of the invention to provide such compositions which when injected provide good penetration into the formation, and which can withstand the high temperatures associated with the steam injection for extended periods.

The above objects of the invention are satisfied by a composition which comprises, and preferably consists essentially of: water; a water-dispersible polymer; a first water-dispersible crosslinker; and a second water-dispersible crosslinker; wherein said first and second crosslinkers have differing temperature responsive crosslinking characteristics over the temperature range of about 70° F. to about 400° F. which enables crosslinking of said polymer and gelation of said composition over substantially the entire temperature range.

According to other aspects of the invention, the composition is injected into a well and the surrounding formation, which preferably have temperature conditions in the range of about 70° F. to about 175° F., to cause one of the crosslinkers to crosslink the polymer which results in gelation of the composition after its penetration into permeable zones of the formation. Subsequently, steam is injected into the well and formation. Temperature conditions in the well and formation then raise to higher temperature conditions in the range of about 175° F. to about 400° F. so as to cause the other crosslinker to crosslink the polymer and preferably further harden the gel in the permeable thief zones of the formation.

According to a preferred embodiment, each of the crosslinkers comprise a phenolic compound and an aldehyde, and the water-dispersible polymer includes an amide containing monomer. Utilizing the composition in steam treatment of a well provides good penetration of the composition into the formation as well as stability of the resulting gel when exposed to steam temperatures for extended periods (i.e. up to several months).

DETAILED DESCRIPTION OF THE INVENTION

As noted above, the composition of the invention broadly comprises water; a water-dispersible polymer; and two crosslinkers with differing temperature responsive crosslinking characteristics over the temperature range of about 70° F. to about 400° F. One crosslinker can be characterized as a "low temperature crosslinker", and the other crosslinker can be characterized as a "high temperature crosslinker". Preferably, the low temperature crosslinker is effective in crosslinking the polymer in a temperature range of about 70° F. to about 175° F., and the high temperature crosslinker is effective in crosslinking the polymer in the range of about 175° F. to about 400° F. In the following detailed description of the inventive composition, the terms high temperature crosslinker and low temperature crosslinker will continue to be used for the sake of convenience to refer to the respective crosslinkers which are activated and effective at the above-mentioned temperature ranges.

Further as used herein, the "water-dispersible" components of the composition include components which are truly water soluble and those which are dispersible in water to form stable suspensions. Also as used herein, the term "weight percent" is that percentage based on the total weight of the composition.

With respect to the crosslinkers generally, any crosslinkers which will effectively crosslink the polymer in the temperature ranges described can be employed. Desirably, such crosslinkers are stable at the temperature and pressure conditions to which they are exposed in a subterranean formation. By use of the term "stable", this is intended to mean that the gel produced by a particular crosslinker retains its viscosity and remains a homogenous, elastic mass which does not shrink or expel water. It is preferred that the low temperature crosslinker is stable until steam is injected and the second high temperature crosslinker is activated by the temperature of the steam. One day to several days of stability is typically sufficient for this purpose. It is preferred that the high temperature crosslinker be stable for somewhat longer periods, for example several weeks or months, during which time the steam is injected.

Preferred low temperature crosslinkers which exhibit highly effective crosslinking with water-dispersible polymers and which exhibit desirable stability characteristics include particular phenolic compounds, later described in detail, in combination with an aldehyde.

Any water-dispersible aldehyde can be utilized in the invention. Thus, suitable aldehydes can be selected from the group consisting of aliphatic monoaldehydes, aromatic monoaldehydes, aliphatic dialdehydes, and aromatic dialdehydes. Preferred aldehydes can be selected from the group consisting of formaldehyde, paraformaldehyde, acetaldehyde, butyraldehyde, isobutyraldehyde, heptaldehyde, decanal, glyoxol, glutaraldehyde, and terephthaldehyde. Formaldehyde is presently preferred due to its effectiveness, ready availability and relatively low expense.

Water-dispersible phenolic compounds suitable for use in the low temperature crosslinker can be characterized by the formula

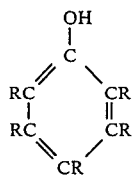

where each R is independently selected from: a hydroxy group; an $NR^1R^1$ group having no more than 6 carbon atoms and where $R^1$ is selected from hydrogen or an alkyl group; an alkoxy group having 1 to 6, preferably 1 to 3, carbon atoms; an $NHCOCH_3$ group; an alkyl group having 1 to 6, preferably 1 to 2, carbon atoms; a phenyl group; and hydrogen; provided further that at least two of the R groups are hydrogens and at least one of the remaining R groups is not a hydrogen. It is most preferred that the nonhydrogen functional groups selected from those above are positioned at the number 3 and/or 5 meta position(s) of the phenolic ring, but any combination of the functional groups can be at any positions around the ring, provided as noted previously that at least two of the functional R groups are hydrogens and at least one of the remaining R groups is not a hydrogen, and provided that the phenolic compound is water-dispersible.

Specific examples of phenolic compounds useable with aldehyde as the low temperature crosslinker include resorcinol, catechol, phlorglucinol(1,3,5-trihydroxybenzene), pyrogallol(1,2,3-trihydroxybenzene), m-aminophenol, m- N-methylaminophenol, m-N-dimethylaminophenol, m-methoxyphenol, m-N-acetamidephenol, m-cresol, and m-phenylphenol. Resorcinol is the presently preferred low temperature phenolic compound due to its effective crosslinking, stability characteristics, low expense and ready availability.

The phenolic compound of the low temperature crosslinker is present in the composition in the range of about 0.01 to about 1.0 weight percent and more preferably in the range of about 0.03 to about 0.3 weight percent. The aldehyde associated with the phenolic compound is present in the composition in the range of about 0.025 to about 1 weight percent most preferably in the range of about 0.03 to about 0.5 weight percent.

Other suitable low temperature crosslinkers include water-dispersible compounds of a metallic cation selected from the group consisting of $Ca^{2+}$, $Mg^{2+}$, $Al^{3+}$, $Cr^{3+}$, $Zn^{2+}$, $Fe^{2+}$, $Fe^{3+}$, $Zr^{4+}$, $Ti^{4+}$, $Sn^{4+}$, wherein the compound is activated and effective in crosslinking the water-dispersible polymer at a temperature of about 70° F. to about 175° F.

The anion(s) associated with one of the above metallic cations is preferably derived from a water-dispersible acid. Specific suitable anions include nitrate, chloride, ortho-phosphate, sulfate, perchlorate, carboxylates having 1 to 3 carbon atoms such as formate, acetate and propionate, α-hydroxy carboxylates such as glycolate and α-hydroxy propionate, α-hydroxy tricarboxylates such as citrate, metaphosphate, nitrilotriacetate, tartrate, tripolyphosphate, and gluconate. Any one or combination of the above anions can be associated with a metallic cation to form the low temperature crosslinking compound.

Specific examples of such low temperature crosslinking compounds include chromium chloride, chromium acetate, chromium propionate, aluminum citrate, zirconium tetraacetate, zirconium chloride, zirconium tetrachloride, ferric citrate, and zinc chloride. Such a low temperature crosslinking compound is generally present in the composition in the amount of about 0.005 to about 0.1 weight percent, most preferably in the amount of about 0.01 to 0.05 weight percent.

Preferred water-dispersible high temperature crosslinkers include particular phenolic compounds, later described in detail, in combination with an aldehyde. The aldehyde can be any one of those previously described. If such a phenolic-aldehyde high temperature crosslinker is used with a phenolic-aldehyde low temperature crosslinker, the aldehydes of each crosslinker may be different aldehydes or the same aldehyde. For example, formaldehyde alone may be used in combination with low and high temperature phenolics to make up both the low and high temperature crosslinkers.

Preferred water-dispersible phenolic compounds for use in the high temperature crosslinker include those of the formula

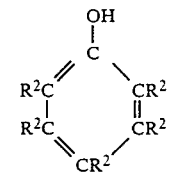

where each $R^2$ is independently selected from one of the groups: $NO_2$; carboxyl; sulfonic acid; CHO; $COR^3$ where $R^3$ is an alkyl group having 1 to 6 carbon atoms, preferably only 1 carbon atom; a halogen such as F, Cl, Br or I; and hydrogen. Any combination of the above functional groups at various positions of the phenolic ring is possible, providing the phenolic compound is water-dispersible.

Specific examples of water-dispersible phenolic compounds for use in the high temperature crosslinker include phenol (where each $R^2$ is hydrogen), nitrophenol, hydroxybenzoic acid, phenolsulfonic acid, bromophenol, chlorophenol, and dichlorophenol. Of the above compounds, phenol is presently preferred.

The phenolic compound for use in the high temperature crosslinker can be present in the composition in the amount of about 0.02 to about 1 weight percent, most preferably in the amount of about 0.05 to about 0.5 weight percent. The aldehyde associated with the phenolic compound can be present in the amount of about 0.025 to about 1 weight percent, most preferably about 0.03 to about 0.5 weight percent.

Other suitable high temperature crosslinkers include water-dispersible chelated complexes of a metallic ion selected from $Zr^{4+}$, $Ti^{4+}$, and $Cr^{3+}$ which effectively crosslink the water-dispersible polymer at temperatures of about 175° F. to about 400° F. As used herein a chelated complex is a compound wherein a metallic ion is complexed with a ligand having more than one functional group bonded to the metallic ion. Chelation imparts additional stability to the complex and thus raises the crosslinking activation temperature.

Preferred chelated complexes include complexes of one of the above metallic cations with at least one $\beta$-diketone, where $\beta$-diketone has the general formula

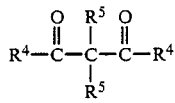

where each $R^4$ is an alkyl group, preferably having 1 to 3 carbon atoms, and where each $R^5$ is independently selected from hydrogen or an alkyl group preferably having 1 to 3 carbon atoms, and provided further that at least one of the $R^5$ groups is hydrogen. An example of a suitable $\beta$-diketone is acetylacetone. Specific examples of complexes with $\beta$-diketones include titanium complexes such as di-isopropoxy-bis-(2,4-pentandionato)-titanium (IV), zirconium complexes such as tetrakis-(2,4-pentandionato)-zirconium (IV) and chromium complexes such as tris-(2,4-pentandionato)chromium (III).

Other chelated complexes suitable for use as the high temperature crosslinkers include complexes of one of the metallic cations with an alkanolamine. Specific examples of such alkanolamines include ethanolamine and triethanolamine. Specific examples of such complexes include di-propoxy-bis-triethanolamine titanate (IV) and di-isopropyl-bis-triethanolamine-titanate(triethanolamine titanate).

A high temperature crosslinking compound of one of the above metallic cations is generally present in the composition in the range of about 0.005 to about 0.1 weight percent, most preferably in the range of about 0.01 to about 0.05 weight percent.

It should be understood that the above described preferred high and low temperature crosslinkers can be combined in any combination. For example, a phenolic-aldehyde crosslinker can be combined with a metallic type crosslinker, or each crosslinker may be of the phenol-aldehyde type, or each crosslinker may be of the metallic type.

It is presently preferred to utilize phenolic-aldehyde type high and low temperature crosslinkers. The most preferred crosslinking system includes resorcinol, phenol and formaldehyde. The resorcinol and phenol are preferably present in amounts like those cited above with respect to the description of the two types of phenolic compounds, and the formaldehyde is preferably present in the amount of about 0.05 to about 2 weight percent. It has been found that this crosslinking system gives highly effective gelation of the composition and provides excellent stability. Furthermore the components are readily available and relatively inexpensive.

Preferred water-dispersible polymers for use with the present invention include polymers containing a monomer with an amide functional group. Such a monomer can be expressed by the formula

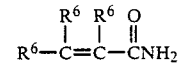

where each $R^6$ is selected from a hydrogen and an alkyl group having from 1 to 3 carbon atoms.

Polymers including a monomer as defined above are particularly preferred when used in conjunction with at least one phenolic-aldehyde crosslinker due to the highly effective crosslinking obtained with such a crosslinker-polymer combination.

Suitable polymers which include the above described monomer are homopolymers of such monomers, and copolymers of such a monomer with any ethylenically unsaturated monomer from the group consisting of acrylic acid, methacrylic acid, vinylsulfonic acid, vinylbenzylsulfonic acid, vinyl acetate, acrylonitrile, methyl acrylonitrile, vinyl alkyl ether, vinyl chloride, maleic anhydride, vinyl substituted cationic quaternary ammonium compounds, 2-acrylamido-2-methyl-propane sulfonic acid, sodium 2-acrylamido-2-methylpropane sulfonate, and viny pyrrolidone.

ParticularLy preferred water-dispersible polymers of the present invention can be selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide, and sodium 2-acrylamido-2-methylpropane sulfonate, and copolymers of acrylamide and sodium 2-acrylamido-2-methylpropane sulfonate.

The relative ratios of the monomers are not critical to the practice of the present invention. However, specific preferred polymers include: a 60:40 weight percent copolymer of vinyl pyrrolidone and acrylamide; a 50:50 weight percent copolymer of vinyl pyrrolidone and acrylamide; a 30:15:55 weight percent terpolymer of vinyl pyrrolidone, acrylamide, and sodium 2-acrylamido-2-methylpropane sulfonate; a 40:60 weight percent copolymer of acrylamide and sodium 2-acrylamido-2-methlypropane sulfonate; and homopolymers of acrylamide wherein not more than about 40% of the carboxyamide groups are hydrolyzed.

Other suitable but less preferred water-dispersible polymers include polysaccharides like cellulose ethers. Examples of such cellulose ethers include various carboxy-alkyl cellulose ethers such as carboxyethyl cellulose and carboxymethyl cellulose (CMC), and mixed ethers such as carboxyalkyl hydroxyalkyl ethers. The class of polymers referred to above as polysaccharides encompasses biopolysaccharides which are biochemically produced by the action of bacteria upon sugar, starches, and similar carbohydrates.

The water-dispersible polymer used in the composition can take any suitable form such as gel-log (a semisolid containing about 50 to about 75 weight percent water), a powder, a solution, an inverse water-in oil emulsion, etc.

The molecular weights of the water-dispersible polymers used in the present invention is not critical. It is preferred however that the polymer have a molecular weight of between 100,000 and 20,000,000. The upper limit of molecular weight is unimportant so long as the polymer is still water-dispersible and can be pumped into a formation.

The polymer, particularly with respect to acrylamide polymers, is present in the composition in the amount of about 0.05 to about 10 weight percent, preferably about 0.2 to about 4 weight percent. The concentration of polymer in the composition depends to some degree upon the molecular weight of the polymer. A higher molecular weight results in a higher viscosity of the resulting gel for a particular concentration of polymer.

The manner in which the water-dispersible polymer is polymerized is not critical to the practice of the present invention. Polymerization can be initiated by chemicals, radiation, or any other technique known to those skilled in the art.

Any suitable method can be employed for preparing the composition of the invention. Thus, any suitable mixing technique or order of addition of the components of the composition to each other can be employed. However, the polymer should be dispersed in water before contacting the polymer with the other components. The mixing order can vary with the type of polymer used.

The composition of the invention can be used in steam treatment of a subterranean formation by injecting the composition into a well which penetrates the formation. The steam treatment method of the invention will be described in terms of cyclic operation wherein the same well is used to inject the steam and produce the oil. Of course, the composition of the invention can be used with other types of steam treatment.

First, the composition is injected into the well, preferably when the well is cold, that is in the temperature range of about 70° F. to about 175° F. and most typically at the lower end of this range. The well and surrounding formation preferably remain in this temperature range during and immediately after the composition injection and until the commencement of steam injection. After injection of the composition is complete, it is typical to shut in the well for a few days and allow the composition to properly set up to a gel in the permeable thief zones of the formation. It should be apparent that it is advantageous to delay the gelation of the composition to permit injection of larger volumes of the composition into the formation and thereby block thief zones that would normally go untreated due to their distance from the injection site. The composition of the invention using low temperature crosslinkers described above enables excellent penetration into the formation because of a relatively slow rate of gelation, as is shown by examples later described.

Next, steam is injected into the well. Such injection can continue for several days to several weeks during which time, and immediately thereafter, the temperature of the formation is generally maintained at temperature conditions (i.e 175° F. to 400° F.) which cause the high temperature crosslinker to effectively crosslink the water-dispsersible polymer and to preferably further harden the gel in the permeable thief zones of the formation. It has been found that crosslinking the polymer with the low temperature crosslinker followed by crosslinking the polymer with the high temperature crosslinker produces in most cases a harder and a longer lasting gel which can withstand the temperatures of the steam for much longer periods than prior art treatments, such as foam treatments. Therefore, blockage of the thief zones is optimized to thereby maximize oil recovery.

After injection of the steam is completed, the well is again shut in and the steam allowed to "soak" for several days. Production can then begin wherein a mixture of water and oil is produced by the well. Conventional equipment is used to separate the oil from the water. In such a cyclic operation, the above steps can be repeated wherein composition and steam are injected into the well, followed by production of oil and water from the well.

As noted previously, the composition of the invention can be used in conjunction with other types of steam treatment. For example, in a "steam drive" operation, cooling water can be injected into the well to cool the well to the desired temperature range after a previous steam treatment. The composition can then be injected as explained above.

Several examples will now be described which should not be construed to limit the invention in any manner.

Some of the examples use a qualitative measurement herein called "gel strength", which is in terms of a percentage. Gel strength for a particular sample is obtained as follows: 20 ml of a pre-gel solution of polymer and crosslinkers are placed in a 23 mm O.D. ×225 mm long ampule. The ampule is sealed under anerobic conditions and aged in the vertical position in an oven for the desired period of time at the desired temperature. After the specified time elapses, the ampule is taken out of the oven and laid horizontally on a graduated scale. If the solution spreads along the whole ampule, then the gel strength is zero and the solution did not gel. If the gel is strong and does not flow, i.e., its length is exactly the same as that of the pre-gel solution, then the gel strength is 100%. Any gel strengths in between these two extremes is calculated from the formula:

$$(AL-TL/AL) \times 100$$

where AL is the ampule length (225 mm) and TL is tongue length of the gel measured on the scale in mm. Tongue length is defined as the length of that portion of the gel within the horizontally disposed ampule which extends beyond the point at which the gel contacts the interior surface of the ampule around the entire circumference of the ampule, after the ampule is horizontal for 1 to 2 minutes.

EXAMPLE I

The purpose of this example is to demonstrate the temperature dependent crosslinking characteristics of a phenol/formaldehyde crosslinking system.

A 0.5 weight percent solution of a polymer composed of 50 parts by weight vinylpyrrolidone (VP) and 50 parts by weight acrylamide (AM) was prepared by dissolving 16.67 grams of a gel-log containing 30 weight percent active polymer in 983.33 ml of water. This solution was left overnight to ensure total hydration of the polymer.

The solution was divided into five 200 ml portions. 0.713 ml (measured with a microsyringe) of an aqueous solution containing 26.4 weight percent phenol and 25.9 weight percent formaldehyde was added to and mixed thoroughly with one such 200 ml polymer solution. The resulting solution contained 0.5 weight percent polymer, 0.1 weight percent phenol and 0.1 weight percent formaldehyde. 20 ml of this solution was placed in each of ten glass ampules having dimensions as described previously. The ampules were purged with nitrogen and sealed. Two ampules were placed vertically in each of five ovens set at 130° F., 175° F., 200° F., 250° F. and 300° F. respectively. The ampules were removed from the ovens periodically, the gel strengths measured, and the time (in days) after commencement of heating recorded. After each gel strength measurement, the ampules were returned to the ovens in a vertical position. Gel strengths measured for each pair of ampules corresponding to a particular oven were averaged to give gel strengths for the various temperatures and time periods as is shown in Table I.

TABLE I

| Time | Gel Strength (%) at Various Temperatures | | | | |
|---|---|---|---|---|---|
| (Days) | 130° F. | 175° F. | 200° F. | 250° F. | 300° F. |
| 1 | 0 | 0 | 0 | 58 | 98 |
| 3 | 0 | 0 | 0 | 97 | 81 |
| 13 | 0 | 0 | 89 | 98 | 73 |
| 31 | 0 | 55 | 97 | 93 | 63 |
| 62 | 0 | 58 | 100 | 96 | 63 |
| 94 | 0 | 88 | 100 | 93 | 65 |
| 141 | 65 | 98 | 97 | 95 | 67 |
| 219 | 66 | 98 | 97 | 94 | 90 |

At 130° F., well over 100 days are required for crosslinking and consequent gelation. The time required for gelation decreases with increasing temperatures. Note in particular that at temperatures of 250° F. and 300° F., the composition gels to desirably high gel strengths after only 1 day of heating. Such temperature conditions are typical in a subterranean formation after steam treatment. Note also that at the higher temperature of 175° F. and above, the gel is extremely stable and in most cases actually increases in gel strength as time of heating progresses. The data therefore illustrates the suitability of phenol-formaldehyde as a high temperature crosslinker.

EXAMPLE II

The purpose of this example is to demonstrate the temperature dependent crosslinking characteristics of a resorcinol-formaldehyde crosslinking system.

350 ml of polymer solution was prepared using the same polymer type, concentration and preparative procedure as described in Example I. 5.46 ml of an aqueous resorcinol solution containing 5.13 weight percent resorcinol, and 16 ml of an aqueous formaldehyde solution containing 4.2 weight percent formaldehyde were added to, and mixed thoroughly with, the polymer solution. The resulting solution therefore contained 0.5 weight percent polymer, 0.08 weight percent resorcinol and 0.2 weight percent formaldehyde.

20 ml of this solution was placed in each of sixteen ampules, which were then purged and sealed as described in Example I. Two ampules were placed in each of eight ovens set at 104° F., 120° F., 130° F., 150° F., 175° F., 200° F., 250° F. and 300° F. respectively. Gel strengths at various times were measured and averaged as in Example I. These results are shown in Table II.

TABLE II

| Time | Gel Strength (%) at Various Temperatures | | | | | | | |
|---|---|---|---|---|---|---|---|---|
| (Days) | 104° F. | 120° F. | 130° F. | 150° F. | 175° F. | 200° F. | 250° F. | 300° F. |
| .08 | 0 | 0 | 0 | 0 | 0 | 13 | 0 | 0 |
| 1 | 35 | 51 | 37 | 40 | 35 | 26 | 0 | 0 |
| 4 | 41 | 35 | 42 | 40 | 24 | 24 | 0 | 0 |
| 14 | 70 | 36 | 39 | 37 | 32 | 27 | 0 | 0 |
| 42 | 40 | 36 | 31 | 53 | 40 | 24 | 0 | 0 |
| 64 | 40 | 35 | 41 | 50 | 40 | 28 | 0 | 0 |
| 77 | 36 | 41 | 33 | 52 | 40 | 29 | 0 | 0 |

It can be seen that no gelation occurs through 77 days at 250° F. or 300° F., indicating that resorcinol-formaldehyde substantially fails to crosslink the polymer after exposure to these temperatures for the indicated time periods. Even at 200° F., Table II shows a general decrease in gel strengths from those obtained at 175° F. The suitability of resorcinol-formaldehyde as a low temperature crosslinker should be apparent from this data.

EXAMPLE III

The purpose of this example is to demonstrate the desirable response of gelable polymer compositions to a resorcinol-phenol-formaldehyde crosslinking system.

1200 ml of polymer solution was prepared using the same polymer type, concentration and preparative procedure as described in Example I. The polymer solution was divided into three 400 ml portions. 5 ml of an aqueous solution containing 5.13 weight percent resorcinol was added to one 400 ml polymer solution portion. 7.5 and 10 ml of the 5.13 percent resorcinol solution were added to the second and third 400 ml portions respectively. The three resulting solutions contained 0.0611, 0.0916 and 0.1222 weight percent resorcinol, respectively.

Each of the three solutions was subdivided into five 80 ml portions. To the five portions were added, respectively, 0.213, 0.284, 0.426, 0.568, and 0.710 ml of the 26.4% phenol and 25.9% formaldehyde solution described in Example I. The resulting phenol/formaldehyde weight percent values were, respectively, 0.075/0.075, 0.100/0.100, 0.150/0.150, 0.200/0.200 and 0.250/0.250. Therefore, fifteen solutions resulted which included three sets of five solutions, wherein each set corresponded to one of the respective resorcinol concentrations (0.0611, 0.0916 and 0.1222 weight percent) and the respective five different phenol/formaldehyde concentrations.

Each of the fifteen solutions was divided equally between four ampules which were purged with nitrogen and sealed. Two ampules were placed in an oven set at 120° F. to test the low temperature response of the composition over an extended period. The other two ampules were placed in another oven set at 130° F. One of the ampules was removed and transferred to a 300° F. oven. No data is presented for the one ampule which remained in the 130° F. oven since the solution therein behaved similarly to the solutions in the 120° F. oven.

Table IIIA sets forth gel strengths at various times which were obtained by heating five pairs of ampules at 120° F. Gel strengths for each pair were averged as described previously. The ampule solutions all had 0.0611 weight percent resorcinol but varying concentrations of phenol/formaldehyde.

TABLE IIIA

Gelation at 120° F. With .0611 wt. % Resorcinol

| Time (Days) | Gel Strength (%) at Various Phenol/Formaldehyde wt. %'s | | | | |
|---|---|---|---|---|---|
| | .075/.075 | .100/.100 | .155/.155 | .200/.200 | .250/.250 |
| 1 | 0 | 0 | 10 | 24 | 26 |
| 4 | 20 | 31 | 33 | 49 | 50 |
| 8 | 24 | 39 | 48 | 53 | 62 |
| 28 | 30 | 44 | 46 | 56 | 57 |
| 40 | 37 | 37 | 56 | 62 | 45 |
| 62 | 26 | 33 | 41 | 49 | 37 |
| 78 | 26 | 38 | 46 | 45 | 57 |

It can be readily seen from Table IIIA that the solutions gel slowly, particularly for the phenol/formaldehyde concentrations of 0.075/0.075 and 0.100/0.100 weight percent. Note for these concentrations, the gel strength was 0 after 1 day. However, the gels formed are relatively weak, particularly at the 0.075/0.075 weight percent phenol/formaldehyde concentrations.

Table IIIB sets forth gel strengths obtained in a manner similar to those obtained in Table IIIA except with a resorcinol concentration of 0.0916 weight percent resorcinol.

TABLE IIIB

Gelation at 120° F. With .0916 wt. % Resorcinol

| Time (Days) | Gel Strength (%) at Various Phenol/Formaldehyde wt. %'s | | | | |
|---|---|---|---|---|---|
| | .075/.075 | .100/.100 | .150/.150 | .200/.200 | .250/.250 |
| .167 | 0 | 0 | 0 | 0 | 0 |
| 3 | 61 | 66 | 69 | 72 | 72 |
| 5 | 61 | 76 | 74 | 72 | 71 |
| 7 | 57 | 47 | 73 | 74 | 76 |
| 27 | 32 | 37 | 69 | 38 | 51 |
| 41 | 23 | 31 | 28 | 34 | 36 |
| 61 | 31 | 31 | 33 | 34 | 36 |
| 77 | 31 | 34 | 36 | 35 | 46 |

A comparison of Tables IIIA and IIIB indicates a generally faster rate of gelation with 0.0916 weight percent resorcinol than with 0.0611 weight percent resorcinol. However Table IIIB does show the gel strengths to be 0 in every case at 0.167 days, thus indicating some delay in gelation. Further, the data of Table IIIB indicates the gels formed after several days are stronger than those formed with 0.0611 weight percent resorcinol.

Table IIIC sets forth gel strengths obtained at 120° F. for a resorcinol concentration of 0.1222 weight percent.

TABLE IIIC

Gelation at 120° F. With .1222 wt. % Resorcinol

| Time (Days) | Gel Strength (%) at Various Phenol/Formaldehyde wt. %'s | | | | |
|---|---|---|---|---|---|
| | .075/.075 | .100/.100 | .150/.150 | .200/.200 | .250/.250 |
| .75 | 0 | 0 | 48 | 66 | 72 |
| 2 | 59 | 63 | 76 | 81 | 80 |
| 3 | 61 | 59 | 81 | 75 | 58 |
| 4 | 52 | 40 | 61 | 62 | 55 |
| 24 | 28 | 28 | 38 | 38 | 35 |
| 38 | 27 | 31 | 34 | 32 | 29 |
| 58 | 19 | 27 | 29 | 30 | 31 |
| 74 | 18 | 22 | 27 | 32 | 28 |

Table IIIC indicates significant delay in gelation at the lower phenol/formaldehyde concentrations and gelation to a strong gel after only 2 days for all phenol/formaldehyde concentrations.

To summarize the data of Tables IIIA, IIIB and IIIC, the data collectively indicates the resorcinol, phenol and formaldehyde crosslinking system to be effective in delayed gelation of the solutions to acceptable strong gels at 120° F. This is desirable in a steam treatment operation, since the solutions injected into a "cold" underground formation should effectively penetrate the formation before gelation and then form acceptably strong gels.

As noted previously, half (thirty) of the originally prepared ampules were placed in a 130° F. oven. After ten days of "aging" in the 130° F. oven five "duplicate" (an ampule of a pair of ampules) ampules having 0.0916 weight percent resorcinol and five duplicate ampules having 0.1222 weight percent resorcinol were removed from the oven. After 11 days of 130° F. aging five duplicate ampules having 0.0611 weight percent resorcinol were removed from the oven. After removal from the 130° F. oven, the ampules were placed in a 300° F. oven to test for the gelation response of the solutions to conditions comparable to steam treatment conditions. The following Tables IIID, IIIE and IIIF set forth gel strengths measured for the 0.0611%, 0.0916% and 0.1222% resorcinol ampules respectively. Note that only one ampule of each ampule pair was transferred to the 300° F. oven, so that the gel strengths given in the following Tables are not averaged values as were obtained in Tables IIIA, IIIB and IIIC.

TABLE IIID

Gelation at 300° F. With .0611 wt. % Resorcinol Solution Age 11 Days at 130° F. Prior to Aging at 300° F.

| Time (Days) | Gel Strength (%) at Various Phenol/Formaldehyde wt. %'s | | | | |
|---|---|---|---|---|---|
| | .075/.075 | .100/.100 | .150/.150 | .200/.200 | .250/.250 |
| 3 | 0 | 41 | 59 | 80 | 79 |
| 10 | 15 | 41 | 64 | 69 | 75 |
| 18 | 22 | 67 | 49 | 64 | 76 |
| 25 | 22 | 49 | 47 | 53 | 57 |
| 31 | 32 | 44 | 50 | 58 | 48 |
| 51 | 44 | 68 | 52 | 57 | 88 |
| 67 | 31 | 40 | 48 | 59 | 53 |
| 88 | 29 | 31 | 48 | 56 | 49 |
| 115 | 27 | 25 | 46 | 48 | 50 |
| 170 | 0 | 0 | 40 | 44 | 45 |

TABLE IIIE

Gelation at 300° F. With .0916 wt. % Resorcinol Solution Aged 10 Days at 130° F. Prior to Aging at 300° F.

| Time (Days) | Gel Strength (%) at Various Phenol/Formaldehyde wt. %'s | | | | |
|---|---|---|---|---|---|
| | .075/.075 | .100/.100 | .150/.150 | .200/.200 | .250/.250 |
| 3 | 19 | 32 | 43 | 48 | 91 |
| 10 | 20 | 27 | 47 | 44 | 84 |
| 18 | 31 | 26 | 78 | 47 | 69 |
| 25 | 29 | 29 | 76 | 46 | 54 |
| 31 | 29 | 32 | 75 | 49 | 52 |
| 51 | 72 | 35 | 86 | 56 | 58 |
| 67 | 78 | 60 | 44 | 84 | 56 |
| 88 | 72 | 36 | 45 | 45 | 56 |
| 115 | 44 | 36 | 57 | 41 | 45 |
| 170 | 44 | 36 | 43 | 46 | 82 |

TABLE IIIF

Gelation at 300° F. With .1222 wt. % Resorcinol Solution Aged 10 Days at 130° F. Prior to Aging at 300° F.

| Time (Days) | Gel Strength (%) at Various Phenol/Formaldehyde wt. %'s | | | | |
|---|---|---|---|---|---|
| | .075/.075 | .100/.100 | .150/.150 | .200/.200 | .250/.250 |
| 7 | 3 | 26 | 32 | 37 | 50 |

TABLE IIIF-continued

Gelation at 300° F. With .1222 wt. % Resorcinol Solution
Aged 10 Days at 130° F. Prior to Aging at 300° F.

| Time | Gel Strength (%) at Various Phenol/Formaldehyde wt. %'s | | | | |
|---|---|---|---|---|---|
| (Days) | .075/.075 | .100/.100 | .150/.150 | .200/.200 | .250/.250 |
| 15 | 33 | 39 | 36 | 60 | 74 |
| 22 | 39 | 37 | 43 | 44 | 50 |
| 28 | 68 | 53 | 83 | 50 | 76 |
| 51 | 52 | 70 | 88 | 47 | 88 |
| 67 | 75 | 87 | 77 | 50 | 56 |
| 88 | 52 | 82 | 67 | 88 | 52 |
| 115 | 46 | 61 | 39 | 88 | 44 |
| 170 | 54 | 52 | 42 | 49 | 47 |

Generally, the data of Tables IIID, IIIE and IIIF indicate that the solutions generally have relatively high gel strengths after exposure to 300° F. for several days. It is important to note that these are temperature conditions encountered in steam treatment. In many cases, the gel actually hardens on continued exposure to the 300° F. conditions. Most importantly, the data shows the gels to be stable through 115 days of treatment in every case. Except for two of the lowest phenol/formaldehyde concentrations at a 0.0611 weight percent resorcinol concentration, all gels remained stable through 170 days of treatment.

The data of Example III therefore clearly shows that solutions in accordance with the invention effectively gel at low temperatures below 175° F., and that gels so formed can withstand temperature conditions associated with well steam treatments for an extended period of time.

EXAMPLE IV

The purpose of this example is to demonstrate that a well treated with a composition in accordance with the invention effectively blocks permeable zones of a formation so that injected steam is necessarily diverted to other zones of the formation.

An aqueous solution was prepared containing 1 weight percent 50:50 vinylpyrrolidone/acrylamide copolymer, 0.4 weight percent phenol, 0.4 weight percent formaldehyde and 0.16 weight percent resorcinol. The treated well has casing and tubing whch extends to respective depths of about 1120 feet and 1240 feet respectively. The well has 160 feet of open sandface. Solution was injected into the well for a period of about 18.5 hours. The well received a total of 2399 pounds of polymer, 381 pounds of resorcinol, 844 pounds of phenol and 897 pounds of formaldehyde. The well was then shut in for four days, after which steam warming was carried out for about twelve hours. Full steam injection was then started. A total of 6181 barrels of steam were injected in this cycle, denoted as cycle A, of a cyclic type operation. Steam injection rates and pressures are shown in Table IVA.

TABLE IVA

| | Cycle A | | |
|---|---|---|---|
| Day | Steam Rate (bbl/hr) | Casing Pressure (psi) | Tubing Pressure (psi) |
| 1 | 26 | 660 | 780 |
| 2 | 27 | 620 | 1000 |
| 3 | 35 | 800 | 950 |
| 4 | 32 | 880 | 860 |
| 5 | 58 | 800 | 840 |
| 6 | 51 | 740 | 840 |
| 7 | 53 | 740 | 840 |

TABLE IVA-continued

| | Cycle A | | |
|---|---|---|---|
| Day | Steam Rate (bbl/hr) | Casing Pressure (psi) | Tubing Pressure (psi) |
| | Total: 6181 bbl | Average: 748 | 878 |

The following Table IVB shows the steam pressures and injection rates for the cycle, denoted as cycle B, immediately preceding Cycle A. No gelable compositions were injected into the well in conjunction with cycle B.

TABLE IVB

| | Cycle B | |
|---|---|---|
| Day | Casing Pressure (psi) | Tubing Pressure (psi) |
| 1 | 250 | 240 |
| 2 | 215 | 240 |
| 3 | 120 | 220 |
| 4 | 110 | 200 |
| 5 | 110 | 200 |
| Average: | 161 | 220 |

By comparing the pressures of Table IVA and IVB, it can be determined that the steam injection pressures through the tubing and the casing in Cycle A were 4.0 and 4.7 times those in Cycle B. This definitely indicates that the injected gelable composition associated with Cycle A successfully gelled in various zones in the formation to create resistance to steam flow into these zones, thereby diverting steam to other less permeable zones.

Even though the composition of the invention was shown to effectively gel and withstand steam temperature conditions during steam injection, production of water and oil decreased from that obtained in Cycle B. Through analysis of injection profiles, it was determined that the steam injected in Cycle A went mainly into ratty sand (shaly sands and/or thinly interbedded sands and shales), which is expected to contain less oil than clean sand. It appears probable that the steam was injected in Cycle A at pressures larger than the fracturing pressure, and when the well was put on production the fractured ratty sand closed up preventing any stimulated oil from reaching the wellbore. This indicates to those skilled in the art of well treatment that this well was overtreated and that more successful results would be achieved through injecting smaller volumes of the gelable composition, which would seal off less of the productive sands.

Obviously many modifications and variations of the present invention are possible in light of the above teachings. It is therefore to be understood that within the scope of the appended claims the invention may be practiced otherwise than as specifically described.

That which is claimed is:

1. A composition consisting essentially of:
    water;
    a water-dispersible polymer in the amount of about 0.05 to about 10 weight percent and containing a monomer of the formula

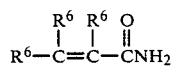

where each $R_6$ is selected from a hydrogen and an alkyl group having from 1 to 3 carbon atoms;

resorcinol in the amount of about 0.01 to about 1 weight percent;

phenol in the amount of about 0.02 to about 1 weight percent; and formaldehyde in the amount of about 0.05 to about 2 weight percent;

wherein said composition is capable of gelation over substantially the entire temperature range of about 70° F. to about 400° F.

2. A composition consisting of:

water;

a water-dispersible polymer in the amount of about 0.05 to about 10 weight percent and containing a monomer of the formula $$R^6-\underset{\underset{R^6}{|}}{C}=\underset{\underset{R^6}{|}}{C}-\underset{\underset{}{\overset{O}{\|}}}{C}NH_2$$

where each $R^6$ is selected from a hydrogen and an alkyl group having from 1 to 3 carbon atoms;

resorcinol in the amount of about 0.01 to about 1 weight percent;

phenol in the amount of about 0.02 to about 1 weight percent; and formaldehyde in the amount of about 0.05 to about 2 weight percent;

wherein said composition is capable of gelation over substantially the entire temperature range of about 70° F. to about 400° F.

* * * * *